(12) United States Patent
Garbacik et al.

(10) Patent No.: US 11,820,393 B2
(45) Date of Patent: Nov. 21, 2023

(54) FUNCTIONALLY SAFE RATIONALIZATION CHECK FOR AUTONOMOUS VEHICLE MACHINE LEARNING ALGORITHMS

(71) Applicants: Neil Garbacik, Lake Orion, MI (US); Dalong Li, Troy, MI (US)

(72) Inventors: Neil Garbacik, Lake Orion, MI (US); Dalong Li, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 359 days.

(21) Appl. No.: 17/082,180

(22) Filed: Oct. 28, 2020

(65) Prior Publication Data

US 2022/0126849 A1    Apr. 28, 2022

(51) Int. Cl.
| | |
|---|---|
| *B60W 50/06* | (2006.01) |
| *G06N 3/08* | (2023.01) |
| *B60W 60/00* | (2020.01) |
| *G06N 20/00* | (2019.01) |
| *G06V 10/22* | (2022.01) |
| *G06V 20/56* | (2022.01) |
| *G06F 18/21* | (2023.01) |

(52) U.S. Cl.
CPC .......... *B60W 50/06* (2013.01); *B60W 60/001* (2020.02); *G06F 18/2193* (2023.01); *G06N 3/08* (2013.01); *G06N 20/00* (2019.01); *G06V 10/22* (2022.01); *G06V 20/56* (2022.01); B60W 2420/42 (2013.01); B60W 2420/52 (2013.01)

(58) Field of Classification Search
CPC ............... B60W 50/06; B60W 60/001; B60W 2420/42; B60W 2420/52; G06N 20/00
See application file for complete search history.

(56) References Cited

U.S. PATENT DOCUMENTS

| | | | |
|---|---|---|---|
| 7,532,109 B2 | 5/2009 | Takahama et al. | |
| 7,720,375 B2 | 5/2010 | Aoki et al. | |
| 9,679,191 B1 | 6/2017 | Zhu et al. | |
| 2006/0064206 A1 | 3/2006 | Merkel et al. | |
| 2018/0101178 A1* | 4/2018 | Yoon ................... | G05D 1/0253 |
| 2019/0139328 A1* | 5/2019 | Yoshizaki ............ | G07C 5/0866 |
| 2019/0147671 A1* | 5/2019 | Yoshizaki ............ | G07C 5/0891 |
| | | | 701/29.1 |
| 2021/0223780 A1* | 7/2021 | Bramley ................ | G06V 10/82 |

* cited by examiner

*Primary Examiner* — Peter D Nolan
*Assistant Examiner* — Mikko Okechukwu Obioha
(74) *Attorney, Agent, or Firm* — Jeremy J. Klobucar

(57) ABSTRACT

Systems and methods for testing a machine learning algorithm or technique of an autonomous driving feature of a vehicle utilize a sensor system configured to capture input data representative of an environment external to the vehicle and a controller configured to receive the input data from the sensor system and perform a testing procedure for the autonomous driving feature that includes inserting known input data into a target portion of the input data to obtain modified input data, processing the modified input data according to the autonomous driving feature to obtain output data, and determining an accuracy of the autonomous driving features based on a comparison between the output data and the known input data.

20 Claims, 3 Drawing Sheets

FUNCTIONALLY SAFE RATIONALIZATION CHECK FOR AUTONOMOUS VEHICLE MACHINE LEARNING ALGORITHMS

FIELD

The present application generally relates to autonomous vehicles and, more particularly, to a functionally safe rationalization check for autonomous vehicle machine learning algorithms.

BACKGROUND

Some vehicles are equipped with an advanced driver assistance (ADAS) or autonomous driving system that is configured to perform one or more assistance or autonomous driving features (adaptive cruise control, lane centering, collision avoidance, etc.). Many of these features utilize machine learning algorithms, such as deep neural networks (DNNs) and various input data (light detection and ranging (LIDAR) point cloud data, camera images, etc.) to generate determinative outputs, such as object detection/classification. Such machine learning algorithms could potentially generate unexpected outputs, which could potentially be of concern. Thus, it is important to be able to easily verify the machine learning algorithm outputs in real-time (e.g., during vehicle operation). Conventional solutions, such as a "checker-doer," are typically computationally intensive (the checker) and typically have complex designs (the doer). Accordingly, while these conventional systems do work well for their intended purpose, there exists an opportunity for improvement in the relevant art.

SUMMARY

According to one example aspect of the invention, a testing system for a machine learning algorithm or technique of an autonomous driving feature of a vehicle is presented. In one exemplary implementation, the testing system comprises a sensor system configured to capture input data representative of an environment external to the vehicle and a controller configured to receive the input data from the sensor system and perform a testing procedure for the autonomous driving feature that includes inserting known input data into a target portion of the input data to obtain modified input data, processing the modified input data according to the autonomous driving feature to obtain output data, and determining an accuracy of the autonomous driving features based on a comparison between the output data and the known input data.

In some implementations, the controller is configured to perform the testing procedure only while the autonomous driving feature is in a disengaged state.

In some implementations, the autonomous driving feature includes a deep neural network (DNN) based object detection/classification algorithm, the sensor system is a camera system, and the input data is a camera image. In some implementations, the known input data is a known image with a known object class. In some implementations, the target portion of the camera image is a non-vulnerable but relevant area of the camera image. In some implementations, the target portion of the camera image is a corner area of the camera image. In some implementations, during a vehicle start-up condition, the target portion of the camera image is any portion of the camera image.

In some implementations, the controller is configured to enable or disable the autonomous driving feature based on whether the output data matches the known input data. In some implementations, the sensor system is a radio detection and ranging (RADAR) or light detection and ranging (LIDAR) system.

According to another example aspect of the invention, a testing method for a machine learning algorithm or technique of an autonomous driving feature of a vehicle is presented. In one exemplary implementation, the testing method comprises receiving, by a controller of the vehicle, input data representative of an environment external to the vehicle from a sensor system of the vehicle that is configured to capture the input data and performing, by the controller, a testing procedure for the autonomous driving feature that includes inserting, by the controller, known input data into a target portion of the input data to obtain modified input data, processing, by the controller, the modified input data according to the autonomous driving feature to obtain output data, and determining, by the controller, an accuracy of the autonomous driving features based on a comparison between the output data and the known input data.

In some implementations, the testing procedure is only performed while the autonomous driving feature is in a disengaged state.

In some implementations, the autonomous driving feature includes a DNN based object detection/classification algorithm, the sensor system is a camera system, and the input data is a camera image. In some implementations, the known input data is a known image with a known object class. In some implementations, the target portion of the camera image is a non-vulnerable but relevant area of the camera image. In some implementations, the target portion of the camera image is a corner area of the camera image. In some implementations, during a vehicle start-up condition, the target portion of the camera image is any portion of the camera image.

In some implementations, the method further comprises enabling or disabling, by the controller, the autonomous driving feature based on whether the output data matches the known input data. In some implementations, the sensor system is a RADAR or LIDAR system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists an opportunity for improvement in the art of vehicle autonomous driving feature machine learning algorithm testing/verification. Accordingly, logical built-in self-test (LBIST) based testing systems and methods are presented herein. For simplicity, the term "autonomous" will hereinafter be used, but it will be appreciated that this encompasses both fully-autonomous (L3, L4, etc.) and semi-autonomous (e.g., ADAS) features (adaptive cruise control, lane centering, collision avoidance, etc.). The techniques of the present disclosure involve an autonomous driving feature having a machine learning algorithm that is tested for accuracy/verification. One example of such a machine learning algorithm is a deep neural network (DNN) for object detection/classification. This DNN could utilize any suitable input data indicative of an environment external to the vehicle. While camera images captured by a camera system are specifically illustrated and described herein, it will be appreciated that the testing techniques of the present disclosure could also be applicable to other sensor systems and corresponding types of input data (radio detection and ranging (RADAR), light detection and ranging (LIDAR), etc.) or fused data (e.g., a combination of multiple sensor systems to create an environmental model).

Figure 1:
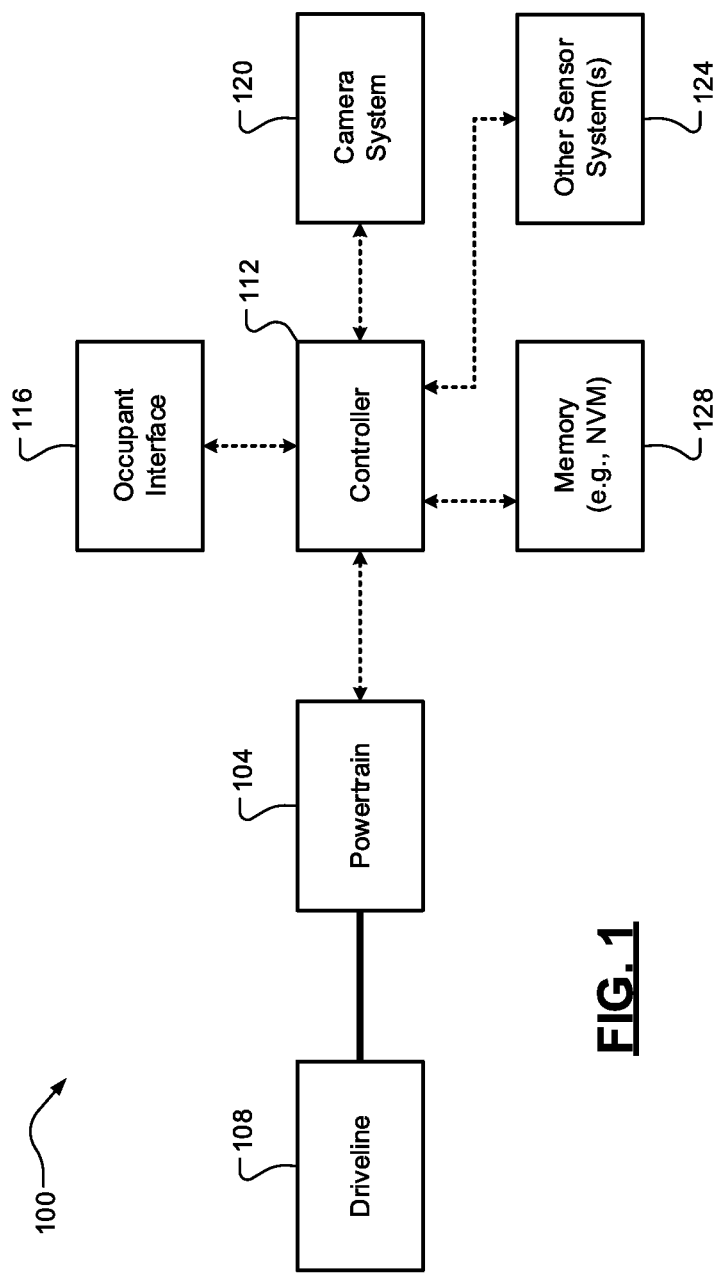
FIG. 1 is a functional block diagram of a vehicle having an example testing system for a machine learning algorithm or technique of an autonomous driving feature according to the principles of the present disclosure.

Referring now to FIG. 1, a functional block diagram of an example vehicle 100 having an autonomous driving system according to the principles of the present disclosure. The vehicle 100 comprises a powertrain (an engine, an electric motor, combinations thereof, etc.) that generates drive torque. The drive torque is transferred to a driveline 108 of the vehicle 100 for propulsion of the vehicle 100. A controller 112 controls operation of the powertrain 104 to achieve a desired amount of drive torque, e.g., based on a driver or occupant torque request provided via a driver or occupant interface 116. The controller 112 also implements one or more autonomous driving or ADAS features (automated braking, collision avoidance, etc.). The autonomous driving system of the present disclosure therefore generally comprises the controller 112, a camera system 120, and potentially one or more other environmental monitoring sensor systems 124 (RADAR, LIDAR, etc.). The camera system 120 is configured to capture images of an environment external to the vehicle 100. For example only, the camera system 120 could be a front-facing camera system configured to capture images of an environment in front of the vehicle 100. In some implementations, the controller 112 accesses a memory 128 (e.g., a non-volatile memory, or NVM) as part of the testing techniques of the present disclosure, which will not be discussed in greater detail.

Figure 2:
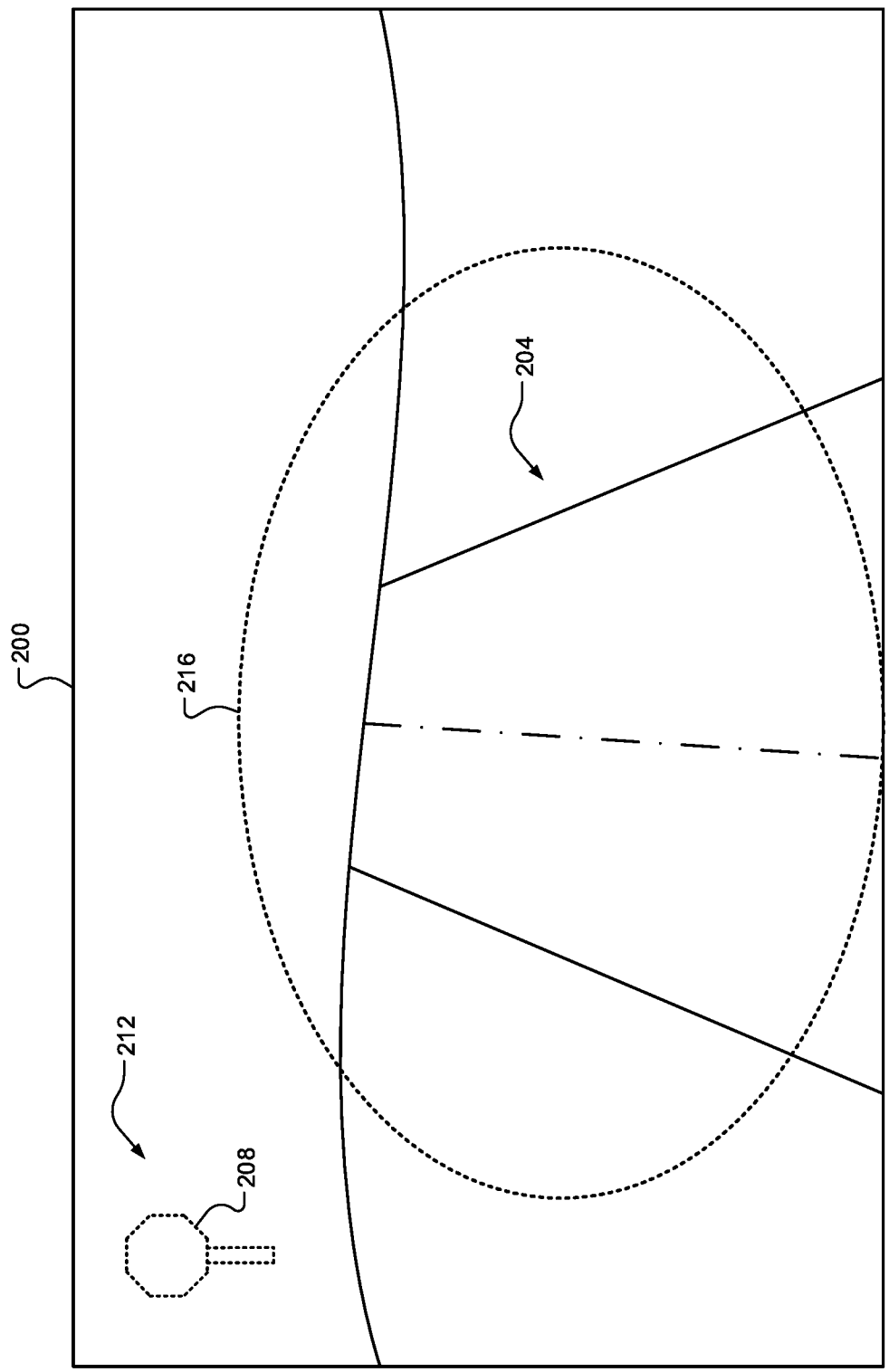
FIG. 2 is an example camera image having a known object inserted therein in a non-vulnerable but relevant area for purposes of testing an object detection/classification algorithm or technique of an autonomous driving feature according to the principles of the present disclosure.
Figure 3:
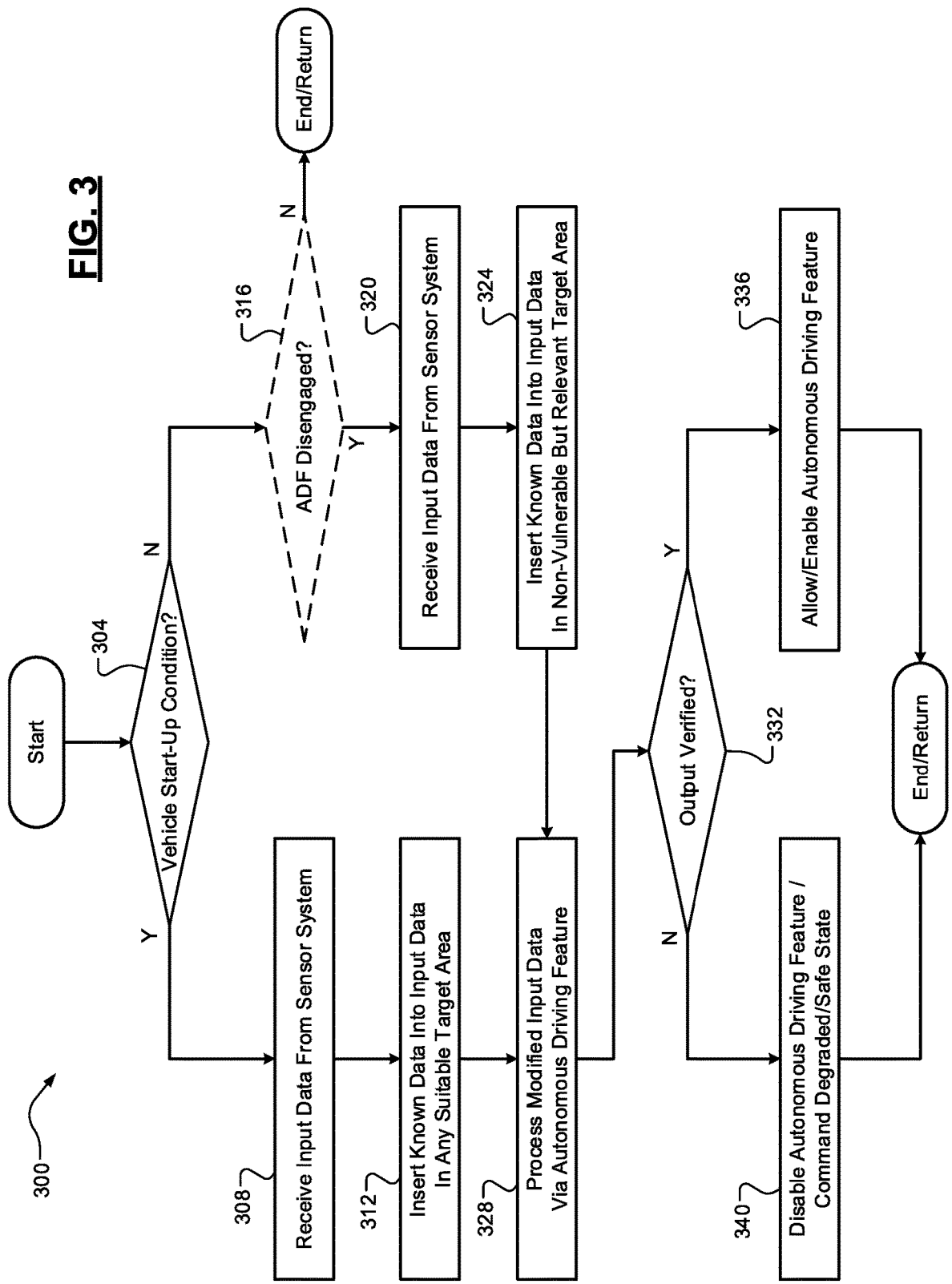
FIG. 3 is a flow diagram of an example testing method for a machine learning algorithm or technique of an autonomous driving feature according to the principles of the present disclosure.

Referring now to FIGS. 2-3, an example captured camera image 200 and a flow diagram of an example testing method 300 for a machine learning algorithm or technique of an autonomous driving feature of a vehicle are illustrated. For example, the machine learning algorithm or technique could be used to enable the autonomous driving feature. While vehicle 100 and its components are specifically referenced, it will be appreciated that the testing techniques of the present disclosure could be applicable to any suitable vehicles running machine learning algorithms. At 304, the controller 112 determines whether a vehicle start-up condition is present. This could include, for example only, the vehicle being powered-on (e.g., key-on) but otherwise not operating (e.g., transmission in park). In this type of condition, known image insertion into the captured camera image could occur in any location as there is little to no risk of causing any safety issues because the vehicle 100 is not currently in motion. When true, the method 300 proceeds to 308. Otherwise, the method 300 proceeds to 316. At 308, the controller 112 receives the camera image 200 as captured by the camera system 120. As shown in FIG. 2, the camera image 200 shows a portion of a road 204 along which the vehicle 100 is traveling.

During a vehicle start-up condition, however, the captured image could not be of a road but rather a parking lot, a garage, or the like. At 312, the controller 112 begins a testing procedure for an autonomous driving feature of the vehicle 100. While a DNN based object detection/classification algorithm of an autonomous driving feature is specifically described, it will be appreciated that the testing techniques could be applicable to any suitable machine learning algorithms and/or other suitable types of input data. At 312, the controller 112 inserts known input data 208 into a target portion of the input data to obtain modified input data. This known input data could be retrieved by the controller 112, for example, from the memory 128. It will be appreciated that the known input data could also be retrieved from another source, such as an external network or server. This insertion of the known image could occur in any portion of the camera image 200 during this vehicle start-up condition. The method 300 then proceeds to 328.

In a parallel path when the determination at 304 is false (i.e., no vehicle start-up condition is present), at 316 the controller 112 optionally determines whether the autonomous driving feature (ADF) is in a disengaged state. For example, an autonomous driving feature may be disengaged during certain conditions, such as when the driver is maintaining full control of the vehicle, when disengagement conditions exist such as no objects being detected nearby, or when the autonomous driving feature is manually disabled by the driver. This determination of whether the autonomous driving feature is in the disengaged state at 316 could be utilized as a precondition for running the testing procedure in order to further ensure operational safety.

When the autonomous driving feature is enabled, the method 300 could end or return to 304. Otherwise, the method 300 proceeds to 320. At 320, the controller 112 receives the camera image 200 as captured by the camera system 120. As shown in FIG. 2, for example the camera image 200 shows a portion of a road 204 along which the vehicle 100 is traveling (i.e., run-time during vehicle operation/movement). At 324, the controller 112 inserts known input data 208 into a target portion of the input data to obtain modified input data. As shown in FIG. 2, this could be an upper corner portion 212 of the camera image 200 that should be relevant but also outside of a vulnerable portion 216 of the camera image 200 (e.g., a central portion of the camera image 200).

The terms "vulnerable area" and "vulnerable portion" as used herein refer to portions of the input data (e.g., the camera image) in which testing should not be occurring in order to maintain safety and to have low or zero risk of interfering with the primary operation of the autonomous driving feature, in the event it is still enabled. In other words, the insertion area does not necessarily need to be in a corner of the captured image 200, but it should still be in a "relevant" area or portion such that the autonomous driving feature must process it.

As shown in FIG. 2, the inserted known input data 208 is a known image with a known classification: a sign, and, more particularly, a stop sign. It will be appreciated that any suitable known image could be utilized (another road sign, such as a speed limit sign, another vehicle, an animal or human, etc.). After insertion, the method 300 proceeds to 328 where the controller 112 processes the modified input data (e.g., camera image 200 with the stop sign 208 inserted therein) according to the autonomous driving feature to obtain output data. For a DNN based object detection/classification algorithm, the output data could be (i) whether an object is detected and (ii), if an object is detected, what type of object it is (a road sign, another vehicle, a human, etc.). At 332, the controller 112 determines an accuracy of the autonomous driving features based on a comparison between the output data and the known input data.

For example, the controller 112 could determine whether the autonomous driving feature correctly identifies and classifies the stop sign 208. When the comparison validates the accuracy of the autonomous driving feature, the autonomous driving feature could continue to be enabled, could switch to being enabled, or could otherwise allowed to be enabled moving forward at 336. Otherwise, the controller 112 could at least temporarily disable the autonomous driving feature or temporarily dial-back vehicle operation via the autonomous driving feature (e.g., a degraded or safe state commanded) until the autonomous driving feature's accuracy can be verified or until vehicle service can be performed at 340. The method 300 then ends or returns to 304 for one or more additional cycles.

It will be appreciated that multiple testing procedures and accuracy verifications could be performed before making a determination on the accuracy of the autonomous driving feature. For example only, multiple different known input datasets (e.g., multiple different object types) could be inserted, in the same or different areas, across multiple testing procedures. This could further improve the accuracy of the testing procedure compared to a conventional "checker" that only runs one independent set of code. The same could be required (i.e., multiple failed testing procedures) before determining an inaccurate autonomous driving feature and subsequently disabling it.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A testing system for a machine learning algorithm or technique of an autonomous driving feature of a vehicle, the testing system comprising:
   a sensor system configured to capture input data representative of an environment external to the vehicle; and
   a controller configured to:
      receive the input data from the sensor system;
      determine whether the autonomous driving feature is in a disengaged state; and
      in response to the autonomous driving feature being in the disengaged state, perform a testing procedure for the autonomous driving feature that includes:
         inserting known input data into a target portion of the input data to obtain modified input data;
         processing the modified input data according to the autonomous driving feature to obtain output data; and
         determining an accuracy of the autonomous driving feature based on a comparison between the output data and the known input data.

2. The testing system of claim 1, wherein the autonomous driving feature includes a deep neural network (DNN) based object detection/classification algorithm, the sensor system is a camera system, and the input data is a camera image.

3. The testing system of claim 2, wherein the known input data is a known image with a known object class.

4. The testing system of claim 3, wherein the target portion of the camera image is a non-vulnerable but relevant area of the camera image.

5. The testing system of claim 4, wherein the target portion of the camera image is a corner area of the camera image.

6. The testing system of claim 3, wherein, during a vehicle start-up condition, the target portion of the camera image is any portion of the camera image.

7. The testing system of claim 1, wherein the controller is configured to enable or disable the autonomous driving feature based on whether the output data matches the known input data.

8. The testing system of claim 1, wherein the sensor system is a radio detection and ranging (RADAR) or light detection and ranging (LIDAR) system.

9. A testing method for a machine learning algorithm or technique of an autonomous driving feature of a vehicle, the testing method comprising:
   receiving, by a controller of the vehicle, input data representative of an environment external to the vehicle from a sensor system of the vehicle that is configured to capture the input data;
   determining, by the controller, whether the autonomous driving feature is in a disengaged state; and
   in response to the autonomous driving feature being in the disengaged state, performing, by the controller, a testing procedure for the autonomous driving feature that includes:
      inserting, by the controller, known input data into a target portion of the input data to obtain modified input data;
      processing, by the controller, the modified input data according to the autonomous driving feature to obtain output data; and
      determining, by the controller, an accuracy of the autonomous driving feature based on a comparison between the output data and the known input data.

10. The testing method of claim 9, wherein the autonomous driving feature includes a deep neural network (DNN) based object detection/classification algorithm, the sensor system is a camera system, and the input data is a camera image.

11. The testing method of claim 10, wherein the known input data is a known image with a known object class.

12. The testing method of claim 11, wherein the target portion of the camera image is a non-vulnerable but relevant area of the camera image.

13. The testing method of claim 12, wherein the target portion of the camera image is a corner area of the camera image.

14. The testing method of claim 11, wherein, during a vehicle start-up condition, the target portion of the camera image is any portion of the camera image.

15. The testing method of claim 9, further comprising enabling or disabling, by the controller, the autonomous driving feature based on whether the output data matches the known input data.

16. The testing method of claim 9, wherein the sensor system is a radio detection and ranging (RADAR) or light detection and ranging (LIDAR) system.

17. A testing method for a machine learning algorithm or technique of an autonomous driving feature of a vehicle, the testing method comprising:
   receiving, by a controller of the vehicle, a camera image representative of an environment external to the vehicle from a camera system of the vehicle that is configured to capture the camera image, wherein the autonomous driving feature includes an object classification/detection algorithm; and
   performing, by the controller, a testing procedure for the autonomous driving feature that includes:
      identifying, by the controller, a target portion of the camera image that is a non-vulnerable but relevant area of the camera image for the autonomous driving feature;
      inserting, by the controller, known input data into the target portion of the camera image to obtain a modified camera image;
      processing, by the controller, the modified camera image according to the autonomous driving feature to obtain output data; and
      determining, by the controller, an accuracy of the autonomous driving feature based on a comparison between the output data and the known input data.

18. The testing method of claim 17, wherein the target portion of the camera image is a corner area of the camera image.

19. The testing method of claim 17, wherein the target portion of the camera image is any area of the camera image outside of a center area of the camera image.

20. The testing method of claim 17, wherein identifying the non-vulnerable but relevant area of the camera image includes determining that no other potential objects in the camera image overlap with the target portion of the camera image.

* * * * *